(12) United States Patent
Ishikawa et al.

(10) Patent No.: US 9,576,160 B2
(45) Date of Patent: Feb. 21, 2017

(54) CARD READER

(71) Applicant: NIDEC SANKYO CORPORATION, Suwa-gun, Nagano (JP)

(72) Inventors: Kazutoshi Ishikawa, Nagano (JP); Shigeki Ozawa, Nagano (JP); Kazunori Takahashi, Nagano (JP)

(73) Assignee: NIDEC SANKYO CORPORATION, NAGANO (JP)

( * ) Notice: Subject to any disclaimer, the term of this patent is extended or adjusted under 35 U.S.C. 154(b) by 0 days.

(21) Appl. No.: 14/413,910

(22) PCT Filed: Feb. 26, 2013

(86) PCT No.: PCT/JP2013/054885
§ 371 (c)(1),
(2) Date: Jan. 9, 2015

(87) PCT Pub. No.: WO2014/010265
PCT Pub. Date: Jan. 16, 2014

(65) Prior Publication Data
US 2015/0161418 A1    Jun. 11, 2015

(30) Foreign Application Priority Data

Jul. 10, 2012 (JP) .................................. 2012-154358

(51) Int. Cl.
G06K 7/08    (2006.01)
G06K 13/06   (2006.01)
G06K 13/08   (2006.01)

(52) U.S. Cl.
CPC .............. *G06K 7/084* (2013.01); *G06K 13/06* (2013.01); *G06K 13/08* (2013.01); *G06K 13/0881* (2013.01)

(58) Field of Classification Search
CPC ................................ G06K 7/084; G06K 7/087
(Continued)

(56) References Cited

U.S. PATENT DOCUMENTS 5,545,883 A * 8/1996 Sasou ............... G06K 19/06187
                                                      235/440
8,313,027 B2 * 11/2012 Ishikawa ............ G06K 13/0875
                                                      235/439
(Continued)

FOREIGN PATENT DOCUMENTS

JP        9128872 A    5/1997
JP       10340405 A   12/1998
(Continued)

OTHER PUBLICATIONS

International Search Report corresponding to International Application No. PCT/JP2013/054885; Date of Mailing: Apr. 23, 2013, with English translation.

*Primary Examiner* — Daniel St Cyr
(74) *Attorney, Agent, or Firm* — Cantor Colburn LLP (57) ABSTRACT

A card reader may include a card insertion part which is formed with an insertion port into which the card is inserted; and a magnetic sensor which is provided in the card insertion part and is structured to detect whether magnetic data are recorded on the card or not. The magnetic sensor may be disposed so as to secure a space between the card inserted into the insertion port and the magnetic sensor. The magnetic data may be arranged in a longitudinal direction of the card. When viewed in a thickness direction of the card which is inserted into the insertion port, a magnetism detection direction of the magnetic sensor may be inclined with respect to a direction perpendicular to the longitudinal direction.

12 Claims, 5 Drawing Sheets (58) Field of Classification Search
USPC .......................................... 235/449, 453, 493
See application file for complete search history.

(56) References Cited

U.S. PATENT DOCUMENTS

| | | | | |
|---|---|---|---|---|
| 2001/0019077 A1* | 9/2001 | Buschmann | ......... | G06K 7/0013 |
| | | | | 235/439 |
| 2004/0094629 A1* | 5/2004 | Hirasawa | ............... | B65H 9/101 |
| | | | | 235/479 |
| 2011/0006118 A1* | 1/2011 | Mizawa | ............. | G06K 13/0843 |
| | | | | 235/483 |

FOREIGN PATENT DOCUMENTS

| | | | |
|---|---|---|---|
| JP | 11283201 A | 10/1999 |
| JP | 2001092915 A | 4/2001 |
| JP | 2003107142 A | 4/2003 |
| JP | 2010160666 A | 7/2010 |
| JP | 2011175594 A | 9/2011 |

* cited by examiner

CARD READER

CROSS REFERENCE TO PRIOR APPLICATIONS

This is the U.S. national stage of application No. PCT/JP2013/054885, filed on Feb. 26, 2013. Priority under 35 U.S.C. §119(a) and 35 U.S.C. §365(b) is claimed from Japanese Application No. 2012-154358, filed Jul. 10, 2012, the disclosures of which are incorporated herein by reference.

FIELD OF THE INVENTION

The present invention relates to a card reader which performs reading of magnetic data recorded on a card and recording of magnetic data on a card.

BACKGROUND

Conventionally, a magnetic head moving type magnetic stripe reading/writing device has been known in which reading and writing of magnetic data are performed on a magnetic stripe in a strip shape formed on a magnetic medium (see, for example, Patent Literature 1). A magnetic stripe is formed on a magnetic medium, which is to be processed in the magnetic stripe reading/writing device described in Patent Literature 1, in a direction perpendicular to a conveying direction of the magnetic medium and magnetic data are arranged in a longitudinal direction of the magnetic stripe. The magnetic stripe reading/writing device includes a sliding mechanism, which moves a magnetic head in a longitudinal direction of the magnetic stripe, and conveying rollers for conveying the magnetic medium in a direction perpendicular to the moving direction of the magnetic head.

Further, conventionally, a card reader has been known for processing a magnetic card and an IC card (for example, see Patent Literature 2). The card reader described in Patent Literature 2 includes a card insertion part formed with an insertion port for a card. The card insertion part includes a card insertion detection mechanism for detecting a card having been inserted into the insertion port and a shutter for opening and closing a card conveying passage. Further, the card insertion part includes a pre-head (magnetic head) for detecting whether magnetic data are recorded on a card or not and a metal sensor for detecting existence/absence of an IC chip of a card. The card insertion detection mechanism includes a sensor lever which is capable of contacting with one end part in a widthwise direction of a card and a card width sensor for detecting whether the sensor lever has been contacted with a card or not. The pre-head is disposed at a position where the pre-head is capable of contacting with a magnetic stripe of a card which is inserted into the insertion port in a correct posture.

In the card reader described in Patent Literature 2, a card which is formed in a substantially rectangular shape is taken into an inside in its longitudinal direction and processed. A magnetic card to be processed in the card reader is formed with a magnetic stripe so that a longitudinal direction of the magnetic stripe is coincided with a longitudinal direction of the card and magnetic data are arranged in the longitudinal direction of the magnetic stripe.

PATENT LITERATURE

[PTL 1] Japanese Patent Laid-Open No. Hei 9-128872
[PTL 2] Japanese Patent Laid-Open No. 2010-160666

In the card reader described in Patent Literature 2, a card insertion detection mechanism, a shutter and a pre-head are provided in the card insertion part. Therefore, in this card reader, for example, only when insertion of a card is detected by the card insertion detection mechanism and magnetic data are detected by the pre-head, it is judged that a normal card recorded with magnetic data has been inserted into the insertion port with a correct posture and thus the shutter is opened so that the card is capable of being taken into an inside of the device. Accordingly, in this card reader, taking-in of an abnormal card and taking-in of a normal card inserted in an incorrect posture can be prevented.

Also in the magnetic stripe reading/writing device described in Patent Literature 1, similarly to the card reader described in Patent Literature 2, it is conceivable that a medium insertion detection mechanism, a shutter and a pre-head are provided in the insertion part for a magnetic medium in order that only a medium which is recorded with magnetic data and is inserted in a correct posture is taken into the inside. However, in the magnetic stripe reading/writing device described in Patent Literature 1, a medium is conveyed in a direction perpendicular in a longitudinal direction of a magnetic stripe. Therefore, when a pre-head is provided in the insertion part, scratches may be formed in a direction perpendicular to the longitudinal direction of the magnetic stripe on a portion where the pre-head is contacted with a magnetic stripe to occur a reading error of magnetic data.

Further, in recent years, in an industry of the financial institutions in which the card reader is utilized, a so-called tapping has been conventionally a serious problem in which a criminal illegally acquires a signal outputted from the pre-head or the like of the card reader to illegally acquire data recorded on the card. In the card reader described in Patent Literature 2, a pre-head is used for detecting whether magnetic data are recorded on a card or not, and a signal corresponding to magnetic data recorded on the card is outputted from the pre-head. Therefore, in this card reader, an output signal from the pre-head may be illegally acquired by a criminal and magnetic data recorded on a card may be illegally acquired.

SUMMARY

In view of the problem described above, at least an embodiment of the present invention provides a card reader for use with a card formed in a substantially rectangular shape which is taken into an inside in its short widthwise direction to perform reading of magnetic data recorded on the card and the like, and the card reader being capable of taking only a card on which magnetic data are recorded and which is inserted in a correct posture into the inside and suppressing occurrence of a reading error of magnetic data.

Further, at least an embodiment of the present invention provides a card reader for use with a card formed in a substantially rectangular shape which is taken into an inside in its longitudinal direction, the card reader being capable of taking only a card on which magnetic data are recorded and which is inserted in a correct posture into the inside and suppressing illegal acquisition of magnetic data recorded on the card.

To achieve the above, at least an embodiment of the present invention provides a card reader for use with a card formed in a substantially rectangular shape which is taken into an inside in its short widthwise direction and the card reader performs at least one of reading of magnetic data recorded on the card and recording of magnetic data on the card. The card reader includes a card insertion part which is formed with an insertion port into which the card is inserted and a magnetic sensor which is provided in the card insertion part for detecting whether magnetic data are recorded on the card or not. The magnetic sensor is disposed so as to secure a space between the card inserted into the insertion port and magnetic sensor, the magnetic data are arranged in a longitudinal direction of the card and, when viewed in a thickness direction of the card which is inserted into the insertion port, a magnetism detection direction of the magnetic sensor is inclined with respect to a direction perpendicular to an arrangement direction of the magnetic data.

In the card reader in accordance with at least an embodiment of the present invention, the card insertion part includes a magnetic sensor for detecting whether magnetic data are recorded on a card or not. Therefore, in at least an embodiment of the present invention, based on a detection result of the magnetic sensor, only a card on which magnetic data are recorded and which is inserted in a correct posture can be taken into the inside. Further, in at least an embodiment of the present invention, the magnetic sensor is disposed so as to secure a space between the card inserted into the insertion port and the magnetic sensor and thus scratches are not formed on a magnetic stripe due to contacting of the magnetic sensor with the magnetic stripe. Accordingly, in at least an embodiment of the present invention, occurrence of a reading error of magnetic data can be suppressed. Further, in at least an embodiment of the present invention, since the magnetic sensor is disposed so as to secure a space between the card inserted into the insertion port and the magnetic sensor, abrasion of the magnetic sensor due to contacting with the card is prevented.

Further, according to examination by the present inventors, it has been found that, in a case that the magnetism detection direction of the magnetic sensor is parallel to a direction perpendicular to an arrangement direction of magnetic data when viewed in a thickness direction of the card, there may be a case that no magnetic data are detected by the magnetic sensor even when magnetic data are recorded on the card. In at least an embodiment of the present invention, the magnetism detection direction of the magnetic sensor when viewed in the thickness direction of the card is inclined with respect to the direction perpendicular to the arrangement direction of magnetic data and thus it can be appropriately detected whether magnetic data are recorded on the card or not.

Further, to achieve the above, at least an embodiment of the present invention provides a card reader for use with a card formed in a substantially rectangular shape which is taken into an inside in its longitudinal direction and the card reader performs at least one of reading of magnetic data recorded on the card and recording of magnetic data on the card. The card reader includes a card insertion part which is formed with an insertion port into which the card is inserted, a magnetic head which performs at least one of reading of the magnetic data and recording of the magnetic data on the card, and a magnetic sensor which is provided in the card insertion part for detecting whether magnetic data are recorded on the card or not. The magnetic sensor is disposed so as to secure a space between the card inserted into the insertion port and the magnetic sensor and, when viewed in a taking-in direction of the card, at least a part of the magnetic sensor and at least a part of the magnetic head are disposed so as to be overlapped with each other in a short widthwise direction of the card which is inserted into the insertion port, the magnetic data are arranged in a longitudinal direction of the card and, when viewed in a thickness direction of the card which is inserted into the insertion port, a magnetism detection direction of the magnetic sensor is inclined with respect to an arrangement direction of the magnetic data.

In the card reader in accordance with at least an embodiment of the present invention, the card insertion part includes a magnetic sensor for detecting whether magnetic data are recorded on a card or not. Therefore, in at least an embodiment of the present invention, based on a detection result of the magnetic sensor, only a card on which magnetic data are recorded and which is inserted in a correct posture can be taken into the inside. Further, according to examination by the present inventors, it has been found that, when viewed in a thickness direction of the card inserted into the insertion port, in a case that an arrangement direction of magnetic data and a magnetism detection direction of the magnetic sensor are parallel to each other, a signal corresponding to magnetic data recorded on the card is outputted from the magnetic sensor. According to at least an embodiment of the present invention, when viewed in a thickness direction of the card inserted into the insertion port, the magnetism detection direction of the magnetic sensor is inclined with respect to the arrangement direction of the magnetic data and thus, a signal which is different from the signal corresponding to the magnetic data is outputted from the magnetic sensor. Therefore, in at least an embodiment of the present invention, illegal acquisition of magnetic data recorded on a card can be suppressed. Further, in at least an embodiment of the present invention, since the magnetic sensor is disposed so as to secure a space between the card inserted into the insertion port and the magnetic sensor, abrasion of the magnetic sensor due to contacting with the card is prevented.

In at least an embodiment of the present invention, it is preferable that the card insertion part includes two magnetic sensors disposed so as to interpose the card in the thickness direction of the card inserted into the insertion port. According to this structure, it can be detected which face of a card inserted into the insertion port magnetic data are recorded. Therefore, it can be further appropriately detected whether a card is inserted into the insertion port in a correct posture or not.

In at least an embodiment of the present invention, it is preferable that the two magnetic sensors which are disposed in the card insertion part are disposed so that at least their parts are overlapped with each other when viewed in the thickness direction of the card which is inserted into the insertion port. According to this structure, for example, in a case that a card formed in a substantially rectangular shape is taken into the card reader in its longitudinal direction, when two magnetic sensors are disposed at positions where a magnetic stripe of the card inserted in a correct posture is passed, a difference between a level of an output signal of one magnetic sensor and a level of an output signal of the other magnetic sensor can be increased. Therefore, it can be appropriately detected which face of a card inserted into the insertion port magnetic data are recorded. Further, for example, in a case that a card formed in a substantially rectangular shape is taken into the card reader in its short widthwise direction, although a magnetic stripe formed in a longitudinal direction of the card is commonly recorded with magnetic data uniformly, there may be a card whose magnetic stripe is not uniformly recorded with magnetic data because the magnetic stripe is partly demagnetized or the like. However, according to this structure, it is easily detected which face of a card magnetic data are recorded.

In at least an embodiment of the present invention, the card reader includes, for example, a control section into which output signals of the two magnetic sensors are inputted, and the control section determines which face of the card the magnetic data are recorded based on levels of the output signals of the two magnetic sensors.

In at least an embodiment of the present invention, it is preferable that the card reader includes a control section which controls the card reader, the card insertion part includes a card insertion detection mechanism for detecting that the card has been inserted into the insertion port, the control section is connected with the magnetic sensor and the card insertion detection mechanism and, when the card insertion detection mechanism detects that the card has been inserted into the insertion port, the control section measures a level of an output signal of the magnetic sensor caused by an external magnetic field before the magnetic data are detected and determines whether the magnetic data are recorded on the card or not based on a measured level of the output signal. When the sensitivity of the magnetic sensor is high, a level of an output signal of the magnetic sensor is easily varied due to influence of an external magnetic field such as geomagnetism but the external magnetic field does not largely vary in a short time. Therefore, according to this structure, since it is determined whether magnetic data are recorded on a card or not based on a level of an output signal of the magnetic sensor caused by an external magnetic field which is measured after insertion of the card is detected and before magnetic data are detected. Accordingly, even when the sensitivity of the magnetic sensor is high, influence of an external magnetic field is suppressed and it can be detected whether magnetic data are recorded on a card or not with a high degree of accuracy. Further, influence of temperature, humidity and the like surrounding the card reader is suppressed and it can be detected whether magnetic data are recorded on a card or not with a high degree of accuracy.

In at least an embodiment of the present invention, the magnetic sensor is, for example, a magnetic impedance sensor or a flux gate sensor. In this case, sensitivity of the magnetic sensor can be enhanced.

As described above, in at least an embodiment of the present invention, in a card reader in which a card formed in a substantially rectangular shape is taken into an inside in its short widthwise direction to be performed with reading of magnetic data recorded on the card and the like, only a card on which magnetic data are recorded and which is inserted in a correct posture can be taken into the inside and occurrence of a reading error of magnetic data can be suppressed. Further, in at least an embodiment of the present invention, in a card reader in which a card formed in a substantially rectangular shape is taken into an inside in its longitudinal direction to be performed with reading of magnetic data recorded on the card and the like, only a card on which magnetic data are recorded and which is inserted in a correct posture can be taken into the inside and, in addition, illegal acquisition of magnetic data recorded on the card can be suppressed.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings.
[First Embodiment]
(Schematic Structure of Card Reader)

Figure 1:
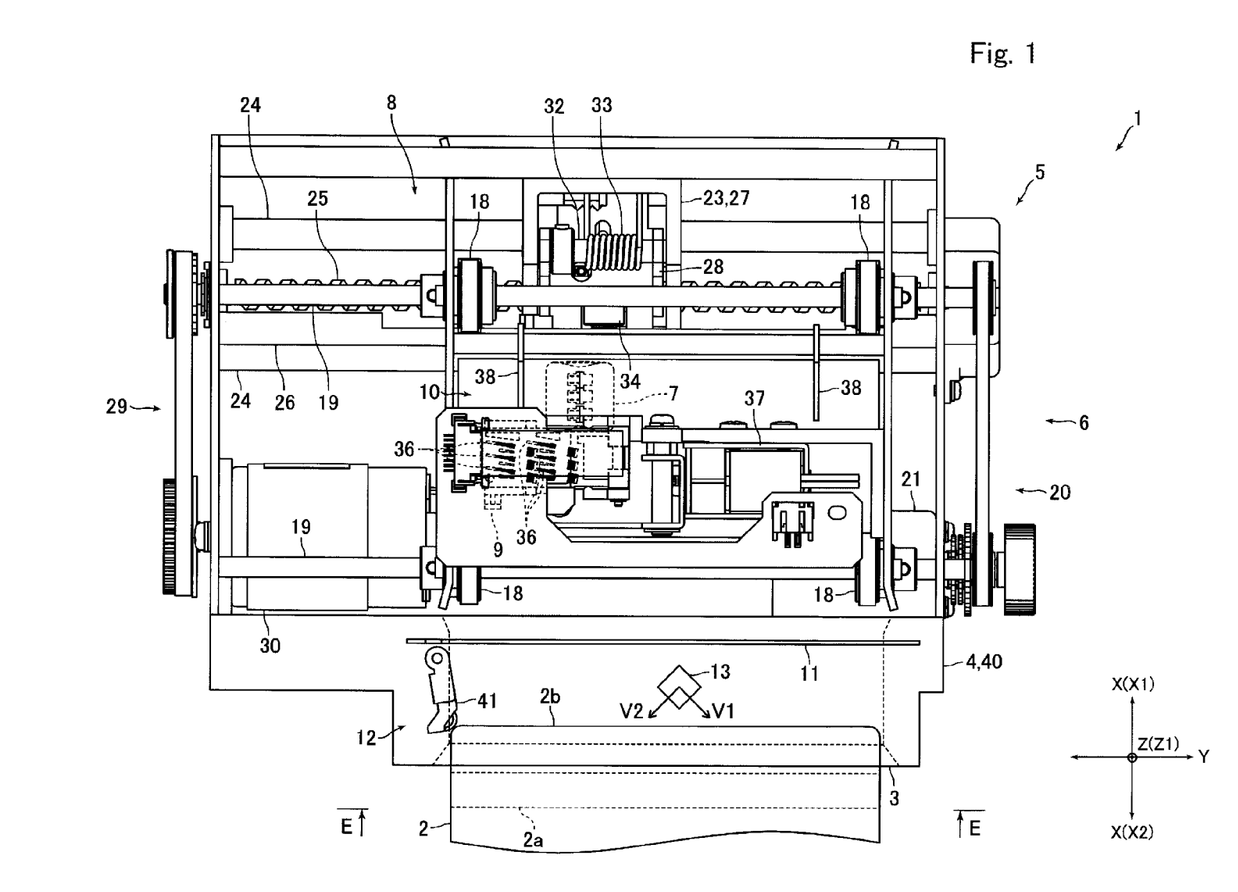
FIG. 1 is a top plan view showing a card reader in accordance with a first embodiment of the present invention.
Figure 2:
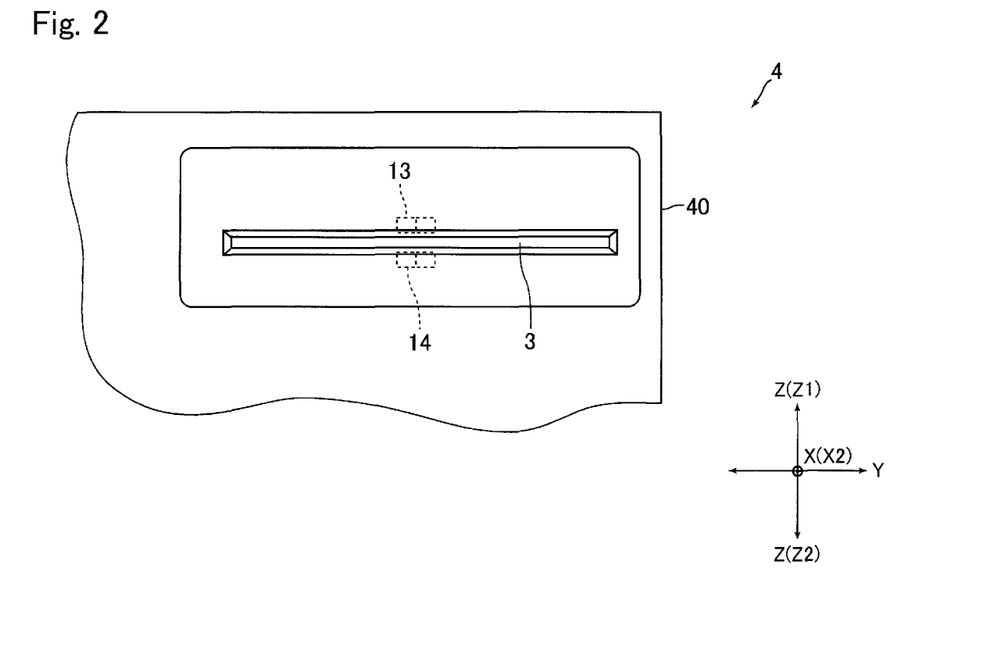
FIG. 2 is a view showing a part of a card insertion part which is viewed in the "E-E" direction in FIG. 1.

FIG. 1 is a top plan view showing a card reader 1 in accordance with a first embodiment of the present invention. FIG. 2 is a view showing a part of a card insertion part 4 which is viewed in the "E-E" direction in FIG. 1.

The card reader 1 in this embodiment is a device for performing at least one of reading of magnetic data recorded on a card 2 and recording of magnetic data to the card 2 and is mounted on and used in a predetermined host device such as an ATM (Automated Teller Machine). The card reader 1 includes a card insertion part 4 formed with an insertion port 3 into which a card 2 is inserted and a main body part 5 which is formed with a card conveying passage along which the card 2 is conveyed. The main body part 5 includes a card conveying mechanism 6 for conveying a card 2, a magnetic head 7 configured to perform reading of magnetic data recorded on the card 2 and recording of magnetic data to the card 2, a head moving mechanism 8 configured to move the magnetic head 7 in a direction perpendicular to a conveying direction of the card 2, an IC contact block 9 configured to contact with a terminal part formed on the card 2 for exchanging data, and a positioning mechanism 10 for positioning the card 2 taken into an inside of the card reader 1.

A card 2 is a card made of vinyl chloride whose thickness is about 0.7-0.8 mm. A card 2 in this embodiment is a card with a magnetic stripe in conformity with the international standard (for example, ISO/IEC 7811) or JIS standard (for example, JISX 6302) and is formed in a substantially rectangular shape. A rear face of a card 2 is formed with a magnetic stripe 2*a* in which magnetic data are recorded. Further, the card 2 is a contact type IC card and a front face of the card 2 is formed with a terminal part (not shown) comprised of eight external connection terminals.

The magnetic stripe 2*a* is formed in a long and thin strip shape which is parallel to a longitudinal direction of the card 2 formed in a substantially rectangular shape. The magnetic stripe 2*a* is formed over the entire region in the longitudinal direction of the card 2. Further, the magnetic stripe 2*a* is formed on one end 2*b* side in the short widthwise direction of the card 2 in the short widthwise direction of the card 2. Specifically, the magnetic stripe 2*a* is formed within a predetermined region with the one end 2*b* of the card 2 as a reference in the short widthwise direction of the card 2 based on the international standard or JIS standard. Magnetic data are capable of being recorded on the magnetic stripe 2*a*. The magnetic data recorded in the magnetic stripe 2*a* are arranged in a longitudinal direction of the magnetic stripe 2*a*

(in other words, a longitudinal direction of a card 2). In other words, in the magnetic stripe 2$a$, magnetic poles are inverted in an "N"-pole and an "S"-pole with a predetermined pitch in its longitudinal direction depending on recorded magnetic data.

In this embodiment, a card 2 is conveyed in an "X" direction which is shown in FIG. 1 and the like. Specifically, a card 2 is taken in an "X1" direction and the card 2 is ejected in an "X2" direction. In other words, the "X" direction is a conveyance direction of a card 2, the "X1" direction is a taking-in direction of the card 2, and the "X2" direction is an ejecting direction of the card 2. Further, in this embodiment, the card 2 is conveyed in the card reader 1 so that the short widthwise direction of the card 2 is coincided with the "X" direction. In other words, in the card reader 1, a card 2 is taken into the inside in the short widthwise direction of the card 2 to perform predetermined processing.

Further, the "Z" direction in FIG. 1 and the like perpendicular to the "X" direction is a thickness direction of a card 2 which has been taken into the card reader 1, and the "Y" direction in FIG. 1 and the like perpendicular to the "X" direction and the "Z" direction is a longitudinal direction of a card 2 which is taken into the card reader 1 in a correct posture. In the following descriptions, the "X" direction is referred to as a "front and rear direction", the "Y" direction is referred to as a "right and left direction" and the "Z" direction is referred to as an "upper and lower direction". Further, the "X1" direction side is referred to as a "rear" (back) side, the "X2" direction side is referred to as a "front" side, the "Z1" direction side is an "upper" side, and the "Z2" direction side is a "lower" side.

The card insertion part 4 is attached to a front end face of the main body part 5. The card insertion part 4 includes a shutter member 11 for closing a rear side of the insertion port 3, a card insertion detection mechanism 12 for detecting a card 2 having been inserted into the card reader 1 (in other words, a card 2 has been inserted into the insertion port 3), and magnetic sensors 13 and 14 (see FIG. 2) for detecting whether magnetic data are recorded on the card 2 or not. A detailed structure of the card insertion part 4 will be described below.

The card conveying mechanism 6 includes conveying rollers (not shown) configured to abut with an under face of a card 2 for conveying the card 2. The conveying rollers are disposed on a front face side and a rear face side of the main body part 5. Further, the conveying roller is disposed on each of both end sides in the right and left direction of the card conveying passage. A pad roller 18 is oppositely disposed to the conveying roller from an upper side. The pad roller 18 is urged toward the conveying roller and is capable of abutting with a card 2 from an upper side. Further, the conveying roller is fixed to a rotation shaft 19 and a motor 21 is connected with the rotation shaft 19 through a power transmission mechanism 20 structured of a belt, a pulley, a gear train and the like.

The head moving mechanism 8 includes a carriage 23 on which a magnetic head 7 is mounted, a guide shaft 24 for guiding the carriage 23 in the right and left direction, a lead screw 25 for feeding the carriage 23 in the right and left direction, and a cam plate 26 for moving the magnetic head 7 up and down. The carriage 23 includes a carriage main body 27 and a head holding member 28 to which the magnetic head 7 is fixed. The carriage main body 27 is attached with a female screw member (not shown) with which the lead screw 25 is engaged and a slide bearing (not shown) which is engaged with the guide shaft 24. The lead screw 25 is connected with a motor 30 through a power transmission mechanism 29 such as a pulley, a belt and the like.

The carriage main body 27 is fixed with a fixed shaft 32, which turnably holds the head holding member 28, with the right and left direction as an axial direction. A torsion coil spring 33 is disposed between the carriage main body 27 and the head holding member 28 and the head holding member 28 is urged by an urging force of the torsion coil spring 33 so that the magnetic head 7 is moved upward with the fixed shaft 32 as a center. The cam plate 26 is formed in a long and thin elongated shape in the right and left direction and the head holding member 28 is rotatably attached with a roller 34 which is capable of abutting with cams (not shown) formed on both end sides in the right and left direction of the cam plate 26.

In this embodiment, when the motor 30 is driven and the lead screw 25 is rotated, the carriage 23 is moved in the right and left direction along the guide shaft 24. The roller 34 is abutted with the cam attached to both end sides of the cam plate 26 on both end sides in the right and left direction and the magnetic head 7 is retreated to a lower side relative to the card conveying passage against an urging force of the torsion coil spring 33. On the other hand, when the roller 34 is disengaged from the cams attached to both end sides of the cam plate 26, the magnetic head 7 which is guided so as to be retreated by the cam to a lower side relative to the card conveying passage is moved upward by the urging force of the torsion coil spring 33 and thereby the magnetic head 7 is capable of abutting with a magnetic stripe 2$a$ of a card 2. When the carriage 23 is moved in the right and left direction while the magnetic head 7 is abutted with a magnetic stripe 2$a$, reading and recording of magnetic data are performed by the magnetic head 7.

The IC contact block 9 includes IC contact springs 36 configured to contact with respective external connection terminals structuring the terminal part of a card 2. The IC contact block 9 is held by a holder. The holder is capable of turning with a predetermined supporting point as a turning center and, when the holder is turned with the supporting point as a center, the IC contact block 9 is moved up and down. The IC contact block 9 is urged to an upper direction by an urging force of a compression coil spring (not shown) so that the IC contact springs 36 are retreated from the card conveying passage. Further, a solenoid 37 is connected with the holder which holds the IC contact block 9. For example, when the solenoid 37 is driven, the IC contact block 9 is moved down against the urging force of the compression coil spring so that the IC contact springs 36 are capable of contacting with the external connection terminals.

The positioning mechanism 10 includes a positioning member 38 which is formed with an abutting part with which a rear end of a card 2 taken into the card reader 1 is abutted, and a retreating mechanism (not shown) which makes the abutting part of the positioning member 38 retreat from the conveying passage. The abutting part of the positioning member 38 is disposed on a rear side relative to the magnetic head 7 in the front and rear direction. In this embodiment, a distance in the front and rear direction between a front face of the abutting part of the positioning member 38 and the insertion port 3 is set to be longer than a width in the short widthwise direction of a card 2. The retreating mechanism includes a predetermined link mechanism, a drive source and the like and moves the positioning member 38 between an abutting position where a rear end of a card 2 is capable of abutting with the abutting part of the positioning member 38 and a retreated position where the abutting part is retreated from the conveying passage. In this embodiment, the positioning member 38 is normally located at the abutting position and, when a predetermined processing is to be performed, the positioning member 38 is moved to the retreated position.

(Structure of Card Insertion Part)

Figure 3:
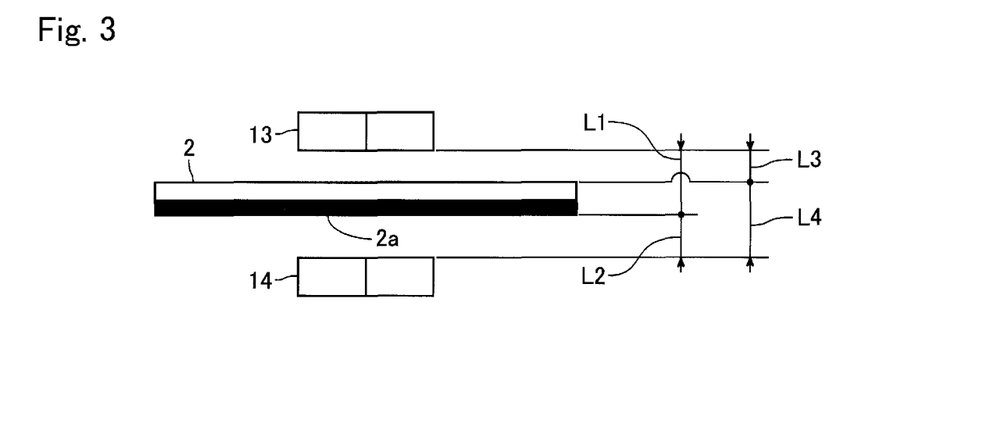
FIG. 3 is a view for explaining a positional relationship in the upper and lower direction between a card having been inserted into the insertion port shown in FIG. 2 and magnetic sensors.

FIG. 3 is a view for explaining a positional relationship in the upper and lower direction between a card 2 having been inserted into the insertion port 3 shown in FIG. 2 and magnetic sensors 13 and 14.

As described above, the card insertion part 4 includes the shutter member 11, the card insertion detection mechanism 12 and the magnetic sensors 13 and 14. Further, the card insertion part 4 includes a hollow-shaped gate member 40. The gate member 40 is formed with the card insertion port 3. Further, the gate member 40 is formed with a card conveying passage which is connected with the card conveying passage of the main body part 5. Further, the shutter member 11, the card insertion detection mechanism 12 and the magnetic sensors 13 and 14 are accommodated in the gate member 40.

The shutter member 11 is formed so as to close the entire rear side of the insertion port 3. The shutter member 11 is connected with a solenoid not shown and the shutter member 11 is moved up and down by power of the solenoid between a close position where a rear side of the insertion port 3 is closed and an opened position where the rear side of the insertion port 3 is opened. In this embodiment, at a standby time before a card 2 is inserted into the card reader 1, the shutter member 11 closes the rear side of the insertion port 3.

The card insertion detection mechanism 12 is a contact type detection mechanism which includes a sensor lever 41, which is capable of contacting with one end part in a longitudinal direction of a card 2, and a card width sensor (not shown) which detects whether the sensor lever 41 is contacted with the card 2 or not. The sensor lever 41 is turnable with a predetermined turning shaft as a center and is capable of protruding to and retreating from the card conveying passage. The card width sensor is a contact switch which includes a lever member and a contact configured to be pressed by the lever member and is, for example, a micro-switch.

In this embodiment, when one end part in a longitudinal direction of a card 2 inserted into the insertion port 3 is contacted with the sensor lever 41, the sensor lever 41 is turned to be contacted with the lever member of the card width sensor and thereby the contact is pressed by the lever member. When the contact is pressed by the lever member, it is detected that a card 2 has been inserted into the insertion port 3. The card width sensor may be an optical type sensor having a light emitting element and a light receiving element. Further, the card insertion detection mechanism 12 may be a mechanical detection mechanism having a contact configured to directly contact with one end part in a longitudinal direction of a card 2.

Magnetic sensors 13 and 14 are flux gate sensors which include an exciting coil, a detection coil and a core around which the exciting coil and the detection coil are wound. Further, the magnetic sensors 13 and 14 are tri-axial magnetic sensors for sensing magnetism in three directions perpendicular to each other (in other words, three directions perpendicular to each other are magnetic detection directions). The magnetic sensors 13 and 14 output respective output signals having a level depending on a distance from a magnetic body. Specifically, levels of output signals from the magnetic sensors 13 and 14 become higher as the distances between the magnetic body and the magnetic sensors 13 and 14 become shorter. Further, the magnetic sensor 13 and the magnetic sensor 14 have the same structure as each other and are adjusted so that their sensibilities are equal to each other.

Further, the magnetic sensors 13 and 14 are disposed in an inside of the gate member 40 so as to interpose a card 2 inserted into the insertion port 3 therebetween in the upper and lower direction. Further, the magnetic sensors 13 and 14 are disposed so that at least parts of them are overlapped with each other when viewed in the upper and lower direction. In this embodiment, when viewed in the upper and lower direction, the magnetic sensors 13 and 14 are disposed so that the magnetic sensor 13 and the magnetic sensor 14 are completely overlapped with each other. Further, in this embodiment, the magnetic sensor 13 is disposed on an upper side relative to the conveying passage and the magnetic sensor 14 is disposed on a lower side relative to the conveying passage. The magnetic sensor 13 is disposed so that its magneto-sensitive surface faces a lower side and the magnetic sensor 14 is disposed so that its magneto-sensitive surface faces an upper side.

The magnetic sensors 13 and 14 are, as shown in FIG. 3, disposed so as to secure spaces between a front face and a rear face of a card 2 having been inserted into the insertion port 3 and the magnetic sensors 13 and 14. Specifically, the magnetic sensors 13 and 14 are disposed so that a distance "L1" between an under face of a card 2 inserted into the insertion port 3 and an under face of the magnetic sensor 13 is longer than a distance "L2" between the under face of the card 2 inserted into the insertion port 3 and an upper face of the magnetic sensor 14 and, in addition, so that a distance "L3" between an upper face of the card 2 inserted into the insertion port 3 and the under face of the magnetic sensor 13 is shorter than a distance "L4" between the upper face of the card 2 inserted into the insertion port 3 and the upper face of the magnetic sensor 14. The magnetic sensors 13 and 14 are disposed on a front side relative to the shutter member 14. Further, the magnetic sensors 13 and 14 are disposed in the right and left direction at positions where a card 2 is passed. For example, the magnetic sensors 13 and 14 are disposed at positions where a substantially center position in the right and left direction of a card 2 inserted in a correct posture is passed.

The magnetic sensors 13 and 14 are disposed so that one of the magnetism detection directions is parallel to the upper and lower direction. Further, the magnetic sensor 13 is disposed so that the remaining two magnetism detection directions are inclined with respect to the front and rear direction (directions shown by the arrows "V1" and "V2" in FIG. 1) when viewed in the upper and lower direction. Similarly, the magnetic sensor 14 is disposed so that the remaining two magnetism detection directions are inclined with respect to the front and rear direction when viewed in the upper and lower direction. In other words, when viewed in the upper and lower direction, remaining two magnetism detection directions of the magnetic sensors 13 and 14 are inclined with respect to the front and rear direction which is perpendicular to an arrangement direction of magnetic data of a card 2 inserted into the insertion port 3. Specifically, when viewed in the upper and lower direction, the remaining two magnetism detection directions of the magnetic sensors 13 and 14 are inclined by about 45° with respect to the front and rear direction and to the right and left direction. Further, when viewed in the upper and lower direction, the remaining two magnetism detection directions of the magnetic sensor 13 are directed to obliquely front directions. In accordance with an embodiment of the present invention, when viewed in the upper and lower direction, the remaining two magnetism detection directions of the magnetic sensors 13 and 14 may be inclined by other than 45° with respect to the front and rear direction and to the right and left direction.

The card width sensor and the magnetic sensors 13 and 14 which structure the card insertion detection mechanism 12 are connected with a control section for controlling the card reader 1. An output signal from the card width sensor and output signals from the magnetic sensors 13 and 14 are inputted into the control section. Further, the control section applies a voltage to exciting coils of the magnetic sensors 13 and 14.

(Taking-in Operation of Card)

Figure 4:
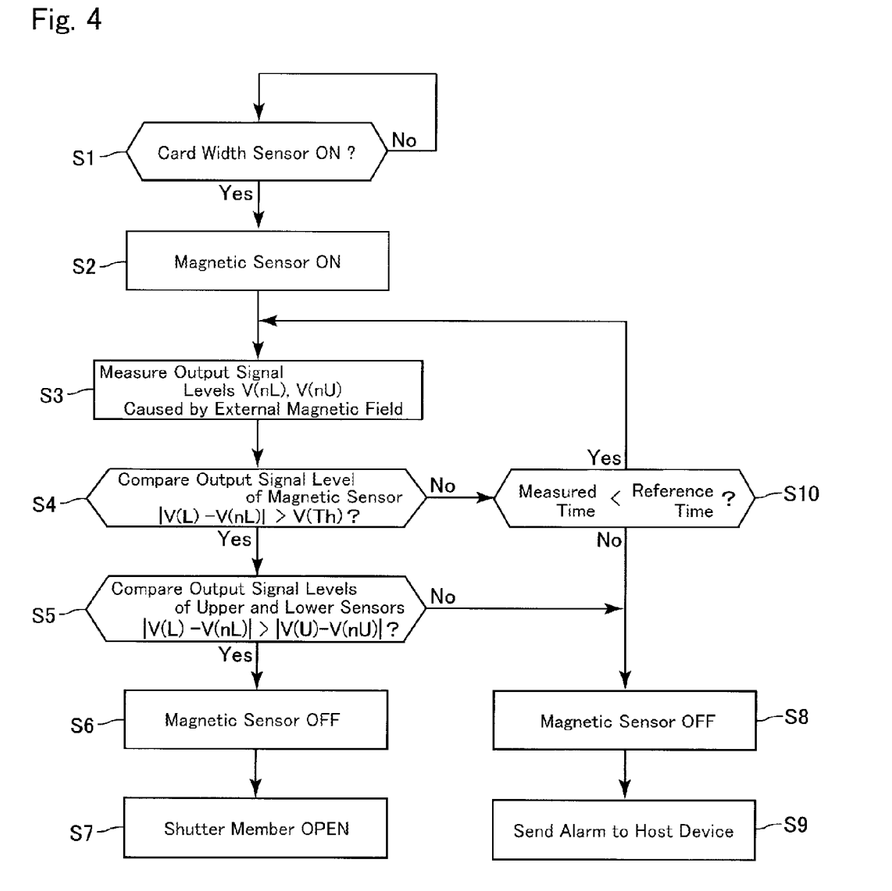
FIG. 4 is a flow chart showing an example of a flow of a taking-in operation of a card in the card reader shown in FIG. 1.

FIG. 4 is a flow chart showing an example of a flow of a taking-in operation of a card 2 in the card reader 1 shown in FIG. 1.

In the card reader 1 structured as described above, when a card 2 recorded with magnetic data is inserted into the insertion port 3 in a state that its rear face faces a lower side and its one end 2b is directed to the rear side, the card 2 is taken into an inside of the card reader 1. In other words, in the card reader 1, when a normal card 2 recorded with magnetic data is inserted into the insertion port 3 in a correct posture, the card 2 is taken into the inside of the card reader 1. An example of a taking-in operation of a card 2 in the card reader 1 will be described below.

As described above, the shutter member 11 has closed the rear side of the insertion port 3 at a standby time before a card 2 is inserted into the card reader 1. Further, in this case, the magnetic sensors 13 and 14 are set in an "OFF" state. In other words, in this case, a voltage is not applied to exciting coils of the magnetic sensors 13 and 14. In this state, when a card 2 is inserted into the insertion port 3 and the card width sensor structuring the card insertion detection mechanism 12 is switched to an "ON" state (step "S1"), a voltage is applied to the exciting coils of the magnetic sensors 13 and 14, and thereby the magnetic sensors 13 and 14 become "ON" states (step "S2"). In other words, when it is detected that a card 2 has been inserted into the insertion port 3 by the card insertion detection mechanism 12, the magnetic sensors 13 and 14 are set in an "ON" state.

In this embodiment, the magnetic sensors 13 and 14 are disposed on a rear side relative to a position of the sensor lever 41 which is contacted with the card 2 and thus, within a predetermined time period after the magnetic sensors 13 and 14 are set in "ON" states at the time of insertion of the card 2, the magnetic stripe 2a is located out of detection ranges of the magnetic sensors 13 and 14. Therefore, within a predetermined time period after the magnetic sensors 13 and 14 are set in "ON" states, the magnetic sensors 13 and 14 output respective output signals having levels caused by only an external magnetic field before magnetic data recorded on the card 2 are detected (external magnetic field except an effect of magnetic data). In this embodiment, when the magnetic sensors 13 and 14 are set in "ON" states, first, the control section of the card reader 1 measures a level V(nU) of an output signal of the magnetic sensor 13 caused by only the external magnetic field and a level V(nL) of an output signal of the magnetic sensor 14 caused by the external magnetic field (step "S3").

After that, the magnetic stripe 2a of the inserted card 2 is reached to detection ranges of the magnetic sensors 13 and 14. The control section measures a level V(U) of the output signal of the magnetic sensor 13 and a level V(L) of the output signal of the magnetic sensor 14 and judges whether an absolute value of a difference between the level V(nL) measured in the step "S3" and the level V(L) exceeds a predetermined threshold value V(th) or not (step "S4"). In accordance with an embodiment of the present invention, the threshold value V(th) which is used in the step "S4" may be set after the level V(nL) is measured in the step "S3" or may be set in advance. Further, the threshold value V(th) is set depending on sensitivities of the magnetic sensors 13 and 14.

When an absolute value of a difference between the level V(L) and the level V(nL) exceeds the threshold value V(th) in the step "S4", it is judged that the card 2 recorded with magnetic data is inserted into the insertion port 3 in a state that its one end 2b is directed to the rear side. Therefore, the control section judges whether the absolute value of the difference between the level V(L) and the level V(nL) exceeds an absolute value of a difference between the level V(U) and the level V(nU) or not (step "S5").

A card 2 recorded with magnetic data is inserted into the insertion port 3 in a state that its rear face faces a lower side, as shown in FIG. 3, a distance "L2" between an under face of the card 2 and an upper face of the magnetic sensor 14 is shorter than a distance "L1" between an under face of the card 2 and an under face of the magnetic sensor 13 and thus the level V(L) becomes higher than the level V(U). Therefore, in the step "S5", when the absolute value of the difference between the level V(L) and the level V(nL) exceeds the absolute value of the difference between the level V(U) and the level V(nU), the control section judges that the card 2 recorded with magnetic data has been inserted into the insertion port 3 in a state that its rear face faces a lower side and the control section sets the magnetic sensors 13 and 14 in "OFF" states (step "S6") and the shutter member 11 is opened so that a rear side of the insertion port 3 is opened (step "S7").

When the rear side of the insertion port 3 is opened, the motor 21 is activated and the card conveying mechanism 6 conveys the card 2 until the one end 2b of the card 2 is abutted with an abutting part of the positioning member 38. After that, the motor 30 is activated and the magnetic head 7 is moved in the right and left direction while abutting with the magnetic stripe 2a of the card 2 to perform reading and recording of magnetic data. Further, the IC contact springs 36 are brought to be contacted with external connection terminals of the card 2 to exchange data with the card 2.

On the other hand, when a card 2 recorded with magnetic data is inserted into the insertion port 3 in a state that its rear face faces an upper side, a distance "L4" between an upper face of the card 2 and an upper face of the magnetic sensor 14 is longer than a distance "L3" between the upper face of the card 2 and an under face of the magnetic sensor 13 and thus the level V(L) is lower than the level V(U). Therefore, in a case that an absolute value of a difference between the level V(L) and the level V(nL) is not more than an absolute value of a difference between the level V(U) and the level V(nU) in the step "S5", the control section judges that the card 2 recorded with magnetic data has been inserted into the insertion port 3 in a state that its rear face faces an upper side and the control section sets the magnetic sensors 13 and 14 in "OFF" states (step "S8") and sends an alarm to the host device (step "S9").

Further, in the step "S4", when an absolute value of a difference between the level V(L) and the level V(nL) is not more than the threshold value V(th), the control section judges whether a measured time of the level V(L) of an output signal from the magnetic sensor 14 is less than a predetermined reference time or not (step "S10"). In the step "S10", in a case that the measured time is less than the predetermined reference time, there may be a case that, even when the card 2 recorded with magnetic data is inserted into the insertion port 3 in a state that its one end 2*b* is directed to the rear side, the magnetic stripe 2*a* of the card 2 is not reached to the detection range of the magnetic sensor 14, and thus the flow is returned to the step "S3".

On the other hand, in the step "S10", when the measured time exceeds the reference time, it is judged that the card 2 is recorded with no magnetic data or that the card 2 has been inserted into the insertion port 3 in a state that its one end 2*b* is directed to the front side. Therefore, the flow advances to the step "S8" and the magnetic sensors 13 and 14 are set in "OFF" states and then, the flow advances to the step "S9" and an alarm is sent to the host device.

In accordance with an embodiment of the present invention, it may be structured that the order of the step "S6" and the step "S7" is rearranged so that the shutter member 11 is opened to open the rear side of the insertion port 3 and then the magnetic sensors 13 and 14 are set in "OFF" states. Further, it may be structured that the order of the step "S8" and the step "S9" is rearranged so that the magnetic sensors 13 and 14 are set in "OFF" states after an alarm is sent to the host device. Further, it may be structured that the order of the step "S1" and the step "S2" is rearranged so that the magnetic sensors 13 and 14 are set in "ON" states in a standby state before a card 2 is inserted into the card reader 1. Alternatively, it may be structured that the magnetic sensors 13 and 14 are always set in "ON" states in a state that a card 2 is capable of being inserted into the card reader 1 without performing the steps "S2", "S6" and "S8". Further, it may be structured that when a measured time is less than a predetermined reference time in the step "S10", the flow is returned to the step "S4".

(Principal Effects in this Embodiment)

As described above, in this embodiment, the magnetic sensors 13 and 14 are disposed in the card insertion part 4. Therefore, in this embodiment, based on detection results of the magnetic sensors 13 and 14, only a card 2 on which magnetic data are recorded and which is inserted in a correct posture can be taken into the inside of the card reader 1. Especially, in this embodiment, two magnetic sensors 13 and 14 are disposed so as to interpose a card 2 inserted into the insertion port 3 in the upper and lower direction and it is judged whether the absolute value of a difference between the level V(L) and the level V(nL) exceeds the absolute value of a difference between the level V(U) and the level V(nU) or not (in other words, based on the levels of the output signals from the two magnetic sensors 13 and 14) and thereby it is determined whether magnetic data are recorded on an upper face or an under face of the card 2 inserted into the insertion port 3. Therefore, in this embodiment, it can be detected whether a card 2 has been inserted into the insertion port 3 with its front and back faces in a correct posture or not and, as a result, it can be further appropriately detected whether the card 2 has been inserted into the insertion port 3 in a correct posture or not.

In this embodiment, the magnetic sensors 13 and 14 are disposed so as to secure spaces between a front face and a rear face of a card 2 inserted into the insertion port 3 and the magnetic sensors 13 and 14. Therefore, in this embodiment, scratches are not formed on a magnetic stripe 2*a* by contacting of the magnetic sensors 13 and 14 with the magnetic stripe 2*a*. Accordingly, in this embodiment, occurrence of a reading error of magnetic data can be suppressed. Further, in this embodiment, since the magnetic sensors 13 and 14 are disposed so that spaces are exist between a front face and a rear face of a card 2 inserted into the insertion port 3 and the magnetic sensors 13 and 14, abrasion of the magnetic sensors 13 and 14 due to contacting with the card 2 is prevented.

According to examination by the present inventors, it has been found that, in a case that two magnetism detection directions of the magnetic sensors 13 and 14 are parallel to the front and rear direction when viewed in the upper and lower direction, since magnetic poles are inverted in an "N"-pole and an "S"-pole in the magnetic stripe 2*a* in its longitudinal direction (in other words, the right and left direction) with a predetermined pitch depending on recorded magnetic data, there may be a case that no magnetic data are detected by the magnetic sensors 13 and 14 even when magnetic data are recorded on the card 2. However, in this embodiment, the magnetic sensors 13 and 14 are disposed so that two magnetism detection directions of the magnetic sensors 13 and 14 when viewed in the upper and lower direction are inclined with respect to the front and rear direction and thus it can be appropriately detected whether magnetic data are recorded on a card 2 or not.

In this case, in comparison with a case that it is detected by the magnetic sensors 13 and 14 whether a magnetic stripe 2*a* is formed on a card 2 or not, when it is detected by the magnetic sensors 13 and 14 whether magnetic data are recorded on a card 2 or not, levels of output signals of the magnetic sensors 13 and 14 become higher. Therefore, when it is determined whether a normal card 2 is inserted into the insertion port 3 in a correct posture or not by detecting whether magnetic data are recorded on the card 2 or not by the magnetic sensors 13 and 14 like this embodiment, it is easily determined whether a normal card 2 has been inserted into the insertion port 3 in a correct posture or not.

In this embodiment, the magnetic sensors 13 and 14 are flux gate sensors and thus their sensitivities can be enhanced. On the other hand, when the sensitivities of the magnetic sensors 13 and 14 become higher, the levels of output signals of the magnetic sensors 13 and 14 are easily varied due to influence of an external magnetic field such as geomagnetism. However, the external magnetic field does not vary largely in a short time. In this embodiment, a card 2 is inserted into the insertion port 3 and then, when the card width sensor structuring the card insertion detection mechanism 12 is switched to an "ON" state and the magnetic sensors 13 and 14 are set in "ON" states, the control section of the card reader 1 first measures a level V(nL) of an output signal of the magnetic sensor 14 caused only by an external magnetic field and it is determined whether magnetic data are recorded on the card 2 or not based on the level V(nL) and a level (L) which is measured afterward. In other words, in this embodiment, it is determined whether magnetic data are recorded on a card 2 or not based on a level (nL) of an output signal of the magnetic sensor 14 caused by an external magnetic field which is measured after insertion of the card 2 and before detecting magnetic data. Therefore, in this embodiment, even when sensitivities of the magnetic sensors 13 and 14 are high, influence of an external magnetic field is suppressed and it can be detected whether magnetic data are recorded on a card 2 or not with a high degree of accuracy. Further, influence of temperature, humidity and the like surrounding the card reader 1 is suppressed and it can be detected whether magnetic data are recorded on a card 2 or not with a high degree of accuracy.

In a case that it is detected whether magnetic data are recorded on a card 2 or not by a pre-head like the card reader described in Patent Literature 2, when an inserting speed of the card 2 into the insertion port 3 is slow, an output of the pre-head is lowered and there may occur a case that it cannot be appropriately detected whether magnetic data are recorded on a card 2 or not. In this embodiment, it is detected whether magnetic data are recorded on a card 2 or not based on detection results of the magnetic sensors 13 and 14 which are flux gate sensors and thus, even when an inserting speed of the card 2 into the insertion port 3 is slow, it can be appropriately detected whether magnetic data are recorded on the card 2 or not. Therefore, according to this embodiment, operability of a user can be enhanced.

[Second Embodiment]

(Schematic Structure of Card Reader)

Figure 5:
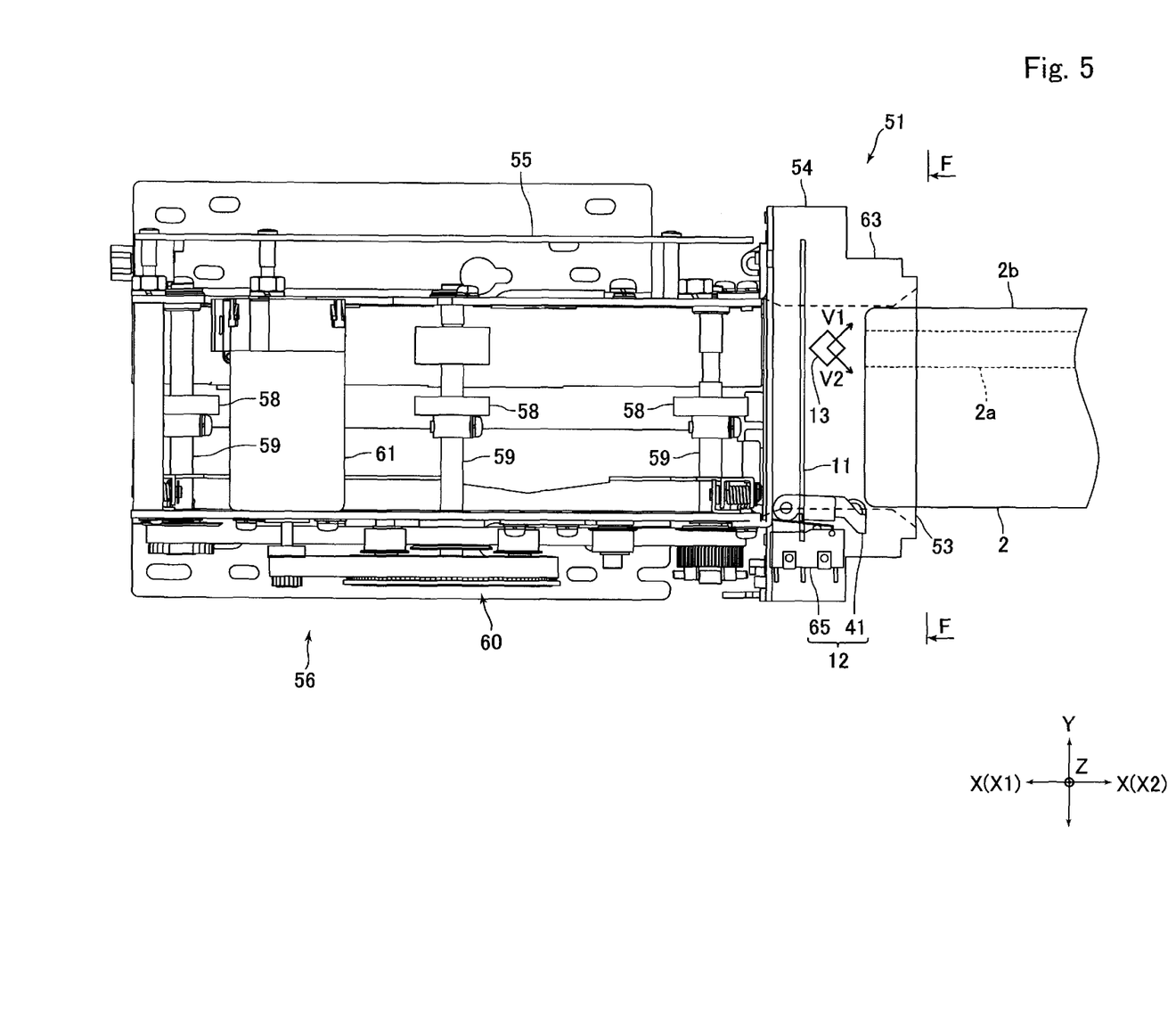
FIG. 5 is a top plan view showing a structure of a part of a card reader in accordance with a second embodiment of the present invention.
Figure 6:
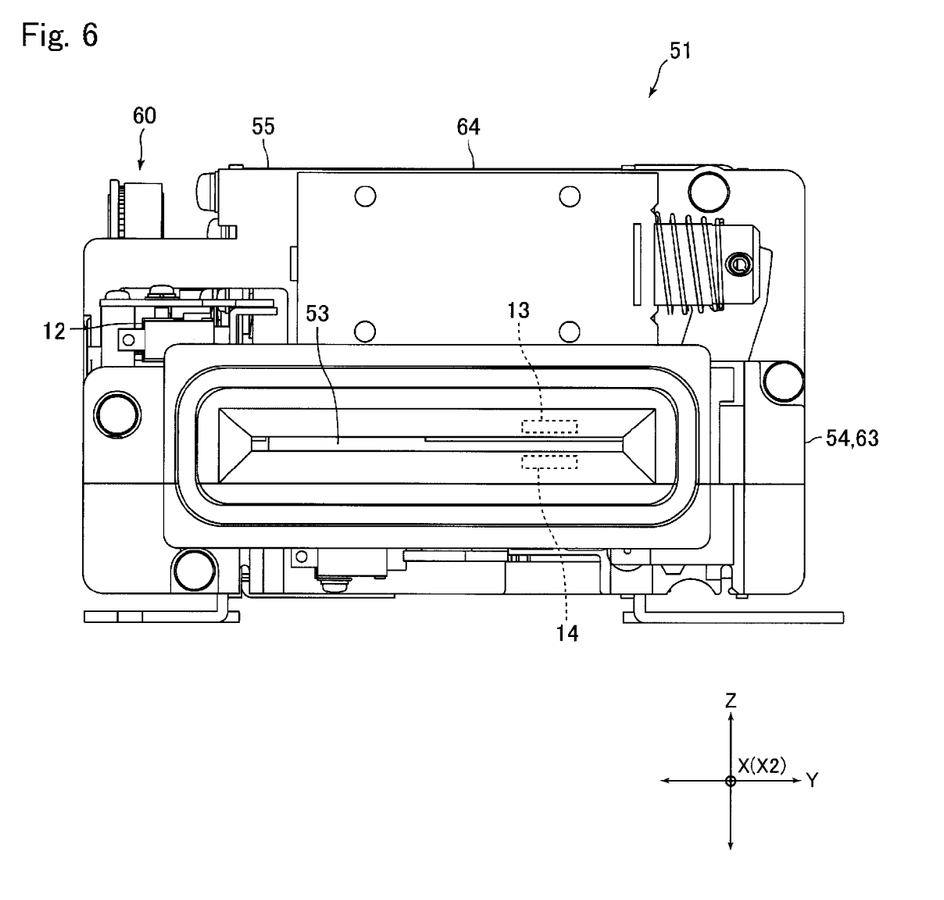
FIG. 6 is a view showing a card reader which is viewed in the "F-F" direction in FIG. 5.

FIG. 5 is a top plan view showing a structure of a part of a card reader 51 in accordance with a second embodiment of the present invention. FIG. 6 is a view showing the card reader 51 which is viewed in the "F-F" direction in FIG. 5.

A card reader 51 in this embodiment is, similarly to the card reader 1 in accordance with the first embodiment, a device for performing at least one of reading of magnetic data recorded on a card 2 and recording of magnetic data to a card 2 and is mounted on and used in a predetermined host device such as an ATM. A main difference between the card reader 51 and the card reader 1 is that the card reader 1 takes a card 2 into an inside in a short widthwise direction of the card 2 to perform a predetermined processing and, on the other hand, the card reader 51 takes a card 2 into an inside in a longitudinal direction of the card 2 to perform a predetermined processing. Next, a structure and an operation of the card reader 51 in the second embodiment will be described below mainly about the difference. In the following descriptions, the same (or similar) structures as the first embodiment are referred with the same reference signs and their descriptions are omitted or simplified.

The card reader 51 includes a card insertion part 54 formed with an insertion port 53 into which a card 2 is inserted and a main body part 55 which is formed with a card conveying passage along which the card 2 is conveyed. The main body part 55 includes a card conveying mechanism 56 for conveying the card 2 and a magnetic head (not shown) configured to abut with the card 2 and perform reading of magnetic data recorded on the card 2 and recording of magnetic data to the card 2. The magnetic head is disposed on a lower side relative to the card conveying passage and is capable of abutting with an under face of the card 2. Further, the magnetic head is disposed at a position where a magnetic stripe 2a of a card 2 having been inserted in a correct posture is passed.

In this embodiment, a card 2 is conveyed in the "X" direction in FIG. 5 and the like. Specifically, the card 2 is taken into an inside in the "X1" direction and the card 2 is ejected in the "X2" direction. Further, in this embodiment, a card 2 is taken into the card reader 51 so that a longitudinal direction of the card 2 is coincided with the "X" direction and is conveyed in an inside of the card reader 51. In other words, the card reader 51 takes a card 2 into an inside in a longitudinal direction of the card 2 to perform a predetermined processing.

The card conveying mechanism 56 includes conveying rollers 58 configured to abut with an upper face of a card 2 and convey the card 2. Pad rollers not shown are oppositely disposed on a lower side with respect to the conveying rollers 58. The pad roller is urged toward the conveying roller 58 and is capable of abutting with the card 2 from a lower side. The conveying roller 58 is fixed to a rotation shaft 59 and the rotation shaft 59 is connected with a motor 61 through a power transmission mechanism 60 structured of a belt, pulleys and the like.

(Structure of Card Insertion Part)

A card insertion part 54 is attached to a front end face of the main body part 55. The card insertion part 54 includes a shutter member 11 for closing a rear side of the insertion port 53, a card insertion detection mechanism 12 and magnetic sensors 13 and 14. Further, the card insertion part 54 includes a hollow-shaped gate member 63. The gate member 63 is formed with the card insertion port 53. Further, the gate member 63 is formed with a card conveying passage which is connected with the card conveying passage of the main body part 55. Further, the shutter member 11, the card insertion detection mechanism 12 and the magnetic sensors 13 and 14 are accommodated in the gate member 63.

The shutter member 11 is connected with a solenoid 64 and the shutter member 11 is moved up and down by power of the solenoid 64 between a close position where a rear side of the insertion port 53 is closed and an opened position where the rear side of the insertion port 53 is opened. The card insertion detection mechanism 12 includes a sensor lever 41 and a card width sensor 65 which detects whether the sensor lever 41 is contacted with a card 2 or not. The card width sensor 65 is a contact switch which includes a lever member and a contact which is to be pressed by the lever member. Almost similarly to the first embodiment, in this embodiment, when one end part in a short widthwise direction of a card 2 inserted into the insertion port 53 is contacted with the sensor lever 41, the sensor lever 41 is turned to be contacted with the lever member of the card width sensor 65 and thereby the contact is pressed by the lever member. Further, when the contact is pressed by the lever member, it is detected that a card 2 has been inserted into the insertion port 53.

The magnetic sensors 13 and 14 are disposed similarly to the first embodiment. In other words, the magnetic sensors 13 and 14 are disposed in an inside of the gate member 63 so as to interpose a card 2 inserted into the insertion port 53 therebetween in the upper and lower direction. Further, the magnetic sensors 13 and 14 are disposed so that at least parts of them are overlapped with each other when viewed in the upper and lower direction. In this embodiment, when viewed in the upper and lower direction, the magnetic sensors 13 and 14 are disposed so that the magnetic sensor 13 and the magnetic sensor 14 are completely overlapped with each other. Specifically, the magnetic sensor 13 is disposed on an upper side relative to the card conveying passage so that its magneto-sensitive surface faces a lower side, and the magnetic sensor 14 is disposed on a lower side relative to the card conveying passage so that its magneto-sensitive surface faces an upper side. Further, in this embodiment, the magnetic sensors 13 and 14 are disposed so that the centers of the magnetic sensors 13 and 14 and the center of the magnetic head in the right and left direction are overlapped with each other in the upper and lower direction when viewed in the front and rear direction.

Further, the magnetic sensors 13 and 14 are disposed so as to secure spaces between a front face and a rear face of a card 2 having been inserted into the insertion port 3 and the magnetic sensors 13 and 14. Further, the magnetic sensors 13 and 14 are disposed so that one of the magnetism detection directions is parallel to the upper and lower direction and the remaining two magnetism detection directions are inclined with respect to the front and rear direction when viewed in the upper and lower direction. Specifically, the magnetic sensors 13 and 14 are disposed so that, when viewed in the upper and lower direction, the remaining two magnetism detection directions of the magnetic sensors 13 and 14 are inclined by about 45° with respect to the front and rear direction and to the right and left direction. Further, when viewed in the upper and lower direction, the remaining two magnetism detection directions of the magnetic sensor 13 are directed to obliquely front directions.

In addition, the magnetic sensors 13 and 14 are disposed on a front side relative to the shutter member 11 in the front and rear direction. Further, the magnetic sensors 13 and 14 are disposed at a position in the right and left direction where a magnetic stripe 2*a* of a card 2 having been inserted in a correct posture is passed. In other words, when viewed in the front and rear direction, the magnetic sensors 13 and 14 are disposed so that at least parts of the magnetic sensors 13 and 14 and at least a part of the magnetic head (not shown) are overlapped with each other in the right and left direction.

The card width sensor 65 and the magnetic sensors 13 and 14 are connected with a control section which controls the card reader 51. An output signal of the card width sensor 65 and output signals of the magnetic sensors 13 and 14 are inputted into the control section. Further, the control section applies a voltage to exciting coils of the magnetic sensors 13 and 14.

(Taking-in Operation of Card)

In the card reader 51 structured as described above, when a card 2 recorded with magnetic data is inserted into the insertion port 53 in a state that its rear face faces a lower side and its one end 2*b* is directed to one side in the right and left direction so that its magnetic stripe 2*a* is passed through the disposing positions of the magnetic head and the magnetic sensors 13 and 14, the card 2 is taken into an inside of the card reader 1. Specifically, almost similarly to the card reader 1, a card 2 is taken into the inside of the card reader 51.

In other words, when the card width sensor 65 is switched to an "ON" state (step "S1"), the magnetic sensors 13 and 14 are set in "ON" states (step "S2") and the control section measures a level V(nU) of an output signal of the magnetic sensor 13 and a level V(nL) of an output signal of the magnetic sensor 14 (step "S3"). After that, a magnetic stripe 2*a* of the inserted card 2 is reached to detection ranges of the magnetic sensors 13 and 14. The control section measures a level V(U) of an output signal of the magnetic sensor 13 and a level V(L) of an output signal of the magnetic sensor 14 and judges whether an absolute value of a difference between the level V(nL) measured in the step "S3" and the level V(L) exceeds a predetermined threshold value V(th) or not (step "S4").

When the absolute value of the difference between the level V(L) and the level V(nL) exceeds the threshold value V(th) in the step "S4", it is judged that the card 2 recorded with magnetic data is inserted into the insertion port 53 in a state that its one end 2*b* is directed to the one side in the right and left direction. Therefore, the control section judges whether the absolute value of the difference between the level V(L) and the level V(nL) exceeds an absolute value of the difference between the level V(U) and the level V(nU) or not (step "S5").

In the step "S5", when the absolute value of the difference between the level V(L) and the level V(nL) exceeds the absolute value of the difference between the level V(U) and the level V(nU), the control section judges that the card 2 recorded with magnetic data has been inserted into the insertion port 53 in a state that its rear face faces a lower side and then the control section sets the magnetic sensors 13 and 14 in "OFF" states (step "S6") and the shutter member 11 is opened so that a rear side of the insertion port 53 is opened (step "S7").

On the other hand, in a case that the absolute value of the difference between the level V(L) and the level V(nL) is not more than the absolute value of the difference between the level V(U) and the level V(nU) in the step "S5", the control section judges that the card 2 recorded with magnetic data has been inserted into the insertion port 53 in a state that its rear face faces an upper side and then the control section sets the magnetic sensors 13 and 14 in "OFF" states (step "S8") and sends an alarm to the host device (step "S9").

Further, in the step "S4", when the absolute value of the difference between the level V(L) and the level V(nL) is not more than the threshold value V(th), the control section judges whether a measured time of the level V(L) of the output signal of the magnetic sensor 14 is less than a predetermined reference time or not (step "S10"). In the step "S10", in a case that the measured time is less than the predetermined reference time, there may be a case that, even when the card 2 recorded with magnetic data is inserted into the insertion port 53 in a state that its one end 2*b* is directed to the one side in the right and left direction, the magnetic stripe 2*a* of the card 2 is not reached to the detection range of the magnetic sensor 14, and thus the flow is returned to the step "S3". On the other hand, in the step "S10", when the measured time exceeds the reference time, it is judged that the card 2 is recorded with no magnetic data or that the card 2 has been inserted into the insertion port 53 in a state that its one end 2*b* is directed to the other side in the right and left direction and thus the flow advances to the steps "S8" and "S9".

(Principal Effects in this Embodiment)

As described above, in this embodiment, similarly to the first embodiment, effects can be obtained, for example, only a card 2 on which magnetic data are recorded and which is inserted in a correct posture is taken into the inside of the card reader 51 based on detection results of the magnetic sensors 13 and 14, occurrence of a reading error of magnetic data is suppressed, and the magnetic sensors 13 and 14 are prevented from contacting with a card 2 to occur abrasion. Further, in this embodiment, similarly to the first embodiment, the following effects are obtained. In other words, even when sensitivities of the magnetic sensors 13 and 14 are high, influence of an external magnetic field is suppressed and it can be detected whether magnetic data are recorded on a card 2 or not with a high degree of accuracy, and influence such as temperature, humidity and the like surrounding the card reader 51 is suppressed and it can be detected whether magnetic data are recorded on a card 2 or not with a high degree of accuracy.

Further, in this embodiment, remaining two magnetism detection directions of the magnetic sensors 13 and 14 are disposed so as to incline with respect to the front and rear direction when viewed in the upper and lower direction. Therefore, a signal corresponding to magnetic data recorded on a card 2 is not outputted from the magnetic sensors 13 and 14 and, instead, a signal which is different from the signal corresponding to the magnetic data is outputted from the magnetic sensors 13 and 14. Accordingly, in this embodiment, illegal acquisition of magnetic data recorded on a card 2 can be suppressed.

Further, in this embodiment, the two magnetic sensors 13 and 14 are disposed so as to be overlapped with each other when viewed in the upper and lower direction and, in addition, the magnetic sensors 13 and 14 are disposed at positions in the right and left direction where a magnetic stripe 2*a* of a card 2 is passed. Therefore, a difference between a level of an output signal of the magnetic sensor 13 and a level of an output signal of the magnetic sensor 14 can be increased. Accordingly, in this embodiment, it can be appropriately determined whether magnetic data are recorded on an upper face of a card 2 having been inserted into the insertion port 53 or an under face of the card 2.

[Other Embodiments]

Although the present invention has been shown and described with reference to specific embodiments, various changes and modifications will be apparent to those skilled in the art from the teachings herein.

In the embodiments described above, the magnetic sensors 13 and 14 are flux gate sensors. However, the magnetic sensors 13 and 14 may be another type magnetic sensor. For example, the magnetic sensors 13 and 14 may be magnetic impedance sensors (MI sensor) which detect magnetic data by utilizing magnetic impedance. In a case that the magnetic sensors 13 and 14 are MI sensors, similarly to a flux gate sensor, sensitivities of the magnetic sensors 13 and 14 are enhanced. Further, the magnetic sensors 13 and 14 may be sensors which detect magnetic data by utilizing a magneto-resistance effect or a Hall effect.

In the embodiments described above, the magnetic sensors 13 and 14 are disposed so that at least their parts are overlapped with each other when viewed in the upper and lower direction. However, the present invention is not limited to this embodiment. For example, in the first embodiment, the magnetic sensors 13 and 14 may be displaced from each other when viewed in the upper and lower direction. Further, in the second embodiment, in a case that it can be appropriately determined whether magnetic data are recorded on an upper face of a card 2 inserted into the insertion port 53 or an under face of the card 2, the magnetic sensors 13 and 14 may be displaced from each other when viewed in the upper and lower direction. Further, in the second embodiment, the positions in the right and left direction of the magnetic sensors 13 and 14 may be displaced from the position where a magnetic stripe 2a of a card 2 inserted in a correct posture is passed.

In the embodiments described above, two magnetic sensors 13 and 14 are disposed so as to interpose a card 2 inserted into the insertion ports 3 and 53 therebetween in the upper and lower direction. However, the present invention is not limited to this embodiment. For example, only one of the magnetic sensor 13 and the magnetic sensor 14 may be disposed.

In the embodiments described above, in the step "S4", the control section judges whether the absolute value of a difference between the level V(nL) and the level V(L) exceeds a predetermined threshold value V(th) or not. However, the present invention is not limited to this embodiment. For example, in the step "S4", the control section may judge whether the level V(L) exceeds a predetermined threshold value or not or may judge whether the level V(L) is less than a predetermined threshold value or not. In this case, for example, the threshold value is set in the step "S3" based on a level V(nL) measured in the step "S3".

In the embodiments described above, the card 2 is a rectangular card made of vinyl chloride whose thickness is about 0.7-0.8 mm. However, the present invention is not limited to this embodiment. For example, the card 2 may be a PET (polyethylene terephthalate) card whose thickness is about 0.18-0.36 mm or may be a paper card having a predetermined thickness. Further, in the embodiments described above, a magnetic stripe 2a is formed on a rear face of a card 2. However, a magnetic stripe may be formed on a front face of a card 2 instead of a rear face of the card 2 or, in addition to the rear face of the card 2. For example, a magnetic stripe in conformity with the standard of "JISX 6302" may be formed on a front face of a card 2.

In accordance with an embodiment of the present invention, in the first embodiment, a terminal part of a card 2 may be detected by the magnetic sensors 13 and 14. In this case, the magnetic sensors 13 and 14 may be disposed at positions in the right and left direction where the terminal part is passed. Further, in the second embodiment, a magnetic sensor for detecting a terminal part of a card 2 may be provided in addition to the magnetic sensors 13 and 14. In this case, the magnetic sensor is disposed at a position in the right and left direction where the terminal part is passed. Further, in this case, it may be structured that a drive circuit for the magnetic sensor and a drive circuit for the magnetic sensors 13 and 14 are structured to be common and the drive circuit is switched so as to drive the magnetic sensor or the magnetic sensors 13 and 14.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card formed in a substantially rectangular shape which is taken into an inside in a short widthwise direction of the card, the card reader performing at least one of reading of magnetic data recorded on the card and recording of magnetic data on the card, the card reader comprising:
   a card insertion part which is formed with an insertion port into which the card is inserted; and
   a magnetic sensor which is provided in the card insertion part for and is structured to detect whether magnetic data are recorded on the card or not;
   wherein the magnetic sensor is disposed so as to secure a space between the card inserted into the insertion port and the magnetic sensor;
   wherein the magnetic data are arranged in a longitudinal direction of the card; and
   wherein when viewed in a thickness direction of the card which is inserted into the insertion port, a magnetism detection direction of the magnetic sensor is inclined with respect to a direction perpendicular to the longitudinal direction.

2. The card reader according to claim 1, wherein the card insertion part includes the magnetic sensors disposed at two positions so as to interpose the card in the thickness direction of the card which is inserted into the insertion port.

3. The card reader according to claim 2, wherein the two magnetic sensors which are disposed in the card insertion part are disposed so that at least their parts are overlapped with each other when viewed in the thickness direction of the card which is inserted into the insertion port.

4. The card reader according to claim 2, further comprising a control section into which output signals of the two magnetic sensors are inputted,
   wherein the control section determines which face of the card the magnetic data are recorded based on levels of the output signals of the two magnetic sensors.

5. The card reader according to claim 1, further comprising a control section structured to control the card reader,
wherein the card insertion part includes a card insertion detection mechanism structured to detect that the card has been inserted into the insertion port,
wherein the control section is connected with the magnetic sensor and the card insertion detection mechanism, and
wherein when the card insertion detection mechanism detects that the card has been inserted into the insertion port, the control section measures a level of an output signal of the magnetic sensor caused by an external magnetic field before the magnetic data are detected and determines whether the magnetic data are recorded on the card or not based on a measured level of the output signal.

6. The card reader according to claim 1, wherein the magnetic sensor is a magnetic impedance sensor or a flux gate sensor.

7. A card reader for use with a card formed in a substantially rectangular shape which is taken into an inside in a longitudinal direction of the card, the card reader performing at least one of reading of magnetic data recorded on the card and recording of magnetic data on the card, the card reader comprising:
a card insertion part which is formed with an insertion port into which the card is inserted;
a magnetic head structured to perform at least one of reading of the magnetic data and recording of the magnetic data on the card; and
a magnetic sensor which is provided in the card insertion part and is structured to detect whether magnetic data are recorded on the card or not;
wherein the magnetic sensor is disposed so as to secure a space between the card inserted into the insertion port and the magnetic sensor;
wherein when viewed in a taking-in direction of the card, at least a part of the magnetic sensor and at least a part of the magnetic head are disposed so as to be overlapped with each other in a short widthwise direction of the card which is inserted into the insertion port;
wherein the magnetic data are arranged in a longitudinal direction of the card; and
wherein when viewed in a thickness direction of the card which is inserted into the insertion port, a magnetism detection direction of the magnetic sensor is inclined with respect to the longitudinal direction of the card.

8. The card reader according to claim 7, wherein the card insertion part includes the magnetic sensors disposed at two positions so as to interpose the card in the thickness direction of the card which is inserted into the insertion port.

9. The card reader according to claim 8, wherein the two magnetic sensors which are disposed in the card insertion part are disposed so that at least their parts are overlapped with each other when viewed in the thickness direction of the card which is inserted into the insertion port.

10. The card reader according to claim 8, further comprising a control section into which output signals of the two magnetic sensors are inputted,
wherein the control section determines which face of the card the magnetic data are recorded based on levels of the output signals of the two magnetic sensors.

11. The card reader according to claim 8, wherein the magnetic sensor is a magnetic impedance sensor or a flux gate sensor.

12. The card reader according to claim 7, further comprising a control section structured to control the card reader,
wherein the card insertion part includes a card insertion detection mechanism structured to detect that the card has been inserted into the insertion port,
wherein the control section is connected with the magnetic sensor and the card insertion detection mechanism, and
wherein when the card insertion detection mechanism detects that the card has been inserted into the insertion port, the control section measures a level of an output signal of the magnetic sensor caused by an external magnetic field before the magnetic data are detected and determines whether the magnetic data are recorded on the card or not based on a measured level of the output signal.

* * * * *